: 2,954,369
Patented Sept. 27, 1960

2,954,369

PRODUCTION OF IMPROVED POLYETHENOXY ESTERS AND PRODUCTS DERIVED THEREFROM

Joseph V. Karabinos and Aloysius T. Ballun, Joliet, Ill., assignors, by mesne assignments, to Olin Mathieson Chemical Corporation, New York, N.Y., a corporation of Virginia Filed June 30, 1953, Ser. No. 365,202

15 Claims. (Cl. 260—97.5)

The present invention relates to non-ionic polyethenoxy compounds and mixtures of a kind initiated by condensing ethylene oxide with materials which are or which contain long-chain monocarboxylic fatty acids both saturated and unsaturated, and rosin acids, both saturated and unsaturated, and in particular tall oil which contains all of said types of acids.

The condensation reaction between many organic compounds and ethylene oxide is well known to follow the courses suggested in Schoeller and Wittwer U.S. No. 1,970,578. Commercial detergents are well known as formed from tall oil and ethylene oxide. Tall oil is rich in rosin acids and being less costly than wood rosin or abietic acid, it is used with ethylene oxide to form desirable condensation products from the rosin acid content and also useful supplementary detergent compounds from other ingredients of the tall oil, and in particular from the fatty acids therein which also condense with ethylene oxide at the same time.

The present invention is directed (a) to the polyethenoxy reaction products of the acids described, and particularly of unsaturated fatty acids selected from the group consisting of unsaturated rosin acids, unsaturated aliphatic monocarboxylic acids, and tall oil; (b) to colored compounds which appear to be present in small but undesirable quantities as by-products resulting from side-reactions during the condensation to form (a); (c) to reaction products of (a) and (b) with certain oxidizing agents, and in particular ozone, to form complete ozonides of (c); and (d) to oxidation and reduction products of (c). That condensation products made from ethylene oxide and tall oil are dark is recognized in U.S. Patent No. 2,594,453, but no information is available to point to impurities as a cause of the dark color. These colored compounds are so-called herein in that they are now known to be different from and darker in color than the principal reaction products. These colored compounds are undesired contaminants of the condensation mass which would otherwise be lighter, more attractive, more useful and more saleable. In fact, the undesired dark color is detrimental to the commercialization of the polyethenoxy tallates and rosinates.

As an introduction to the present invention, it is known that an aqueous solution of hydrogen peroxide will react with such dark colored products deriving from unsaturated rosin acids, or from tall oil containing such, to lighten the color and reduce or remove a fluorescence which characterizes such colored products. The action of hydrogen peroxide is limited. According to the present invention, ozone may be used in place of hydrogen peroxide, or following the use of hydrogen peroxide. Ozone lightens the color to a greater degree than does hydrogen peroxide, and in addition reacts upon unsaturated acid radicals to form new compounds having new and useful properties.

It is the general object of the present invention to subject the above described condensation products of ethylene oxide and said acids to oxidizing material including finally ozone to effect reaction to varying degrees, and thereby to secure products varying in several desirable properties.

It is one object of the present invention to lighten the color of the above described condensation products.

It is a particular object of the invention to lighten the color of the colored condensation products by the action of ozone with or without prior reaction with hydrogen peroxide.

It is an object of the present invention to subject such condensation products to the action of ozone to an extent beyond that action which effects the lightening of color.

It is a particular object of the invention to subject such polyethenoxy esters of said acids to the action of ozone for improving their detergent values and bactericidal values.

It is also an object of the invention to form ozonides from polyethenoxy esters of said acids, which ozonides are suitable starting materials for reactions with certain other oxidizing agents and certain reducing agents to form numerous useful compounds, both new and old.

It is also an object of the invention to subject such polyethenoxy esters of said acids to the action of ozone substantially to the capacity of ozone to react therewith, and then to subject the mass with its resulting ozonides either to an oxidation or a reduction to open or split the molecule at the location of a double bond in the original ester.

Various other and ancillary objects and advantages of the invention will appear from the following description and explanation, which is given in connection with the accompanying drawing, in which.

Figure 1:
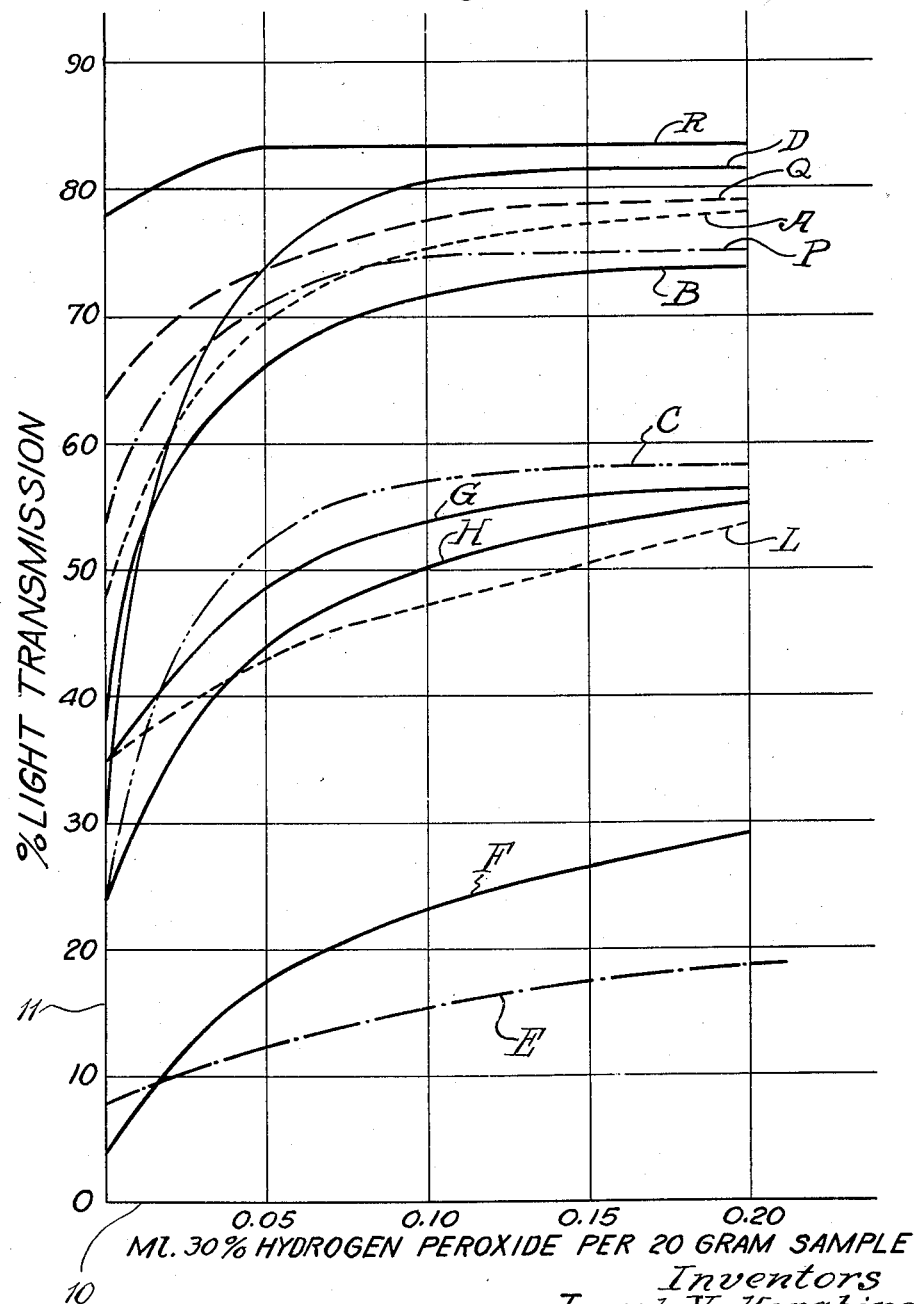
Fig. 1 shows the curves resulting from reactions in stepwise addition of hydrogen peroxide to such condensation products, thus illustrating the lightening of color by increased light transmission.

The present invention is based upon the discoveries that ozone will do all that hydrogen peroxide does in regard to lightening the color, and that it will react beyond the capacity of hydrogen peroxide to form new compounds, believed to be ozonides at the locations of double bonds. This belief is supported by the fact that when such supposed ozonides are subjected to the action of hydrogen peroxide, or to reduction through the agency of zinc dust, in each case compounds are formed, which are acids, aldehydes or ketones, of structure indicating a split of the molecule at the double bond.

The conventional condensation of ethylene oxide has been carried out with various materials consisting of or including unsaturated acids, such as oleic acid, saturated fatty acid such as palmitic, various commercial grades of tall oil, and pure abietic acid itself. In those products deriving from a rosin acid there is present a dark brown color with newly created greenish fluorescence. It was observed that the esters from acids highest in rosin acid content were the darkest and most fluorescent. The fact that the color and fluorescence are reduced by the action of aqueous hydrogen peroxide has been accepted as confirmation of a theory that a quinoid compound was formed during the condensation.

The present invention is based upon the discovery that ozone also acts to lighten the color of the fluorescing condensates to a condition of less fluorescence, yielding more desirable condensation masses. One use of the commercial products so colored as described is as a component in dry solid comminuted detergent compositions comprising largely white colored inorganic salt crystals. The coloring ingredient imparts a dirty appearance to such compositions, which is a deterrent to such use. By practice of the present invention the color may be so lightened that such dirty appearance is avoided.

In so using ozone to lighten color of tall oil esters, it was found that much more of it is consumed than its equivalent to hydrogen peroxide, thus leading to the discovery that the ozone functions at double bonds to form ozonides, not only in the rosin acids, but in fatty acid components of the tall oil. This has been substantiated by use of oleic acid alone. Thus, the invention is directed generically to polyethenoxy esters of unsaturated monocarboxylic acids, including rosin acids, fatty acids, and various low-cost mixtures of the two known as tall oil.

It is pointed out that in the previous paragraph it is stated that the invention is directed to the polyethenoxy esters of unsaturated acids. However, more generically expressed, it also relates to the products of condensing ethylene oxide with saturated as well as unsaturated fatty and rosin acids, for the reason that in the condensation there is believed to be a reaction which creates double bonds in saturated molecules. For example, color is formed in using only oleic acid, and only palmitic acid, which color is reducible by ozone as described herein. However, the color is least in the case of palmitic acid.

Tall oils vary in specific compositions and in general are as follows:

| | Percent by weight |
|---|---|
| Fatty acids | 30–45 |
| Oleic | 45 |
| Linoleic | 48 |
| Palmitic | 7 |
| Rosin acids | 50–55 |
| Abietic | 30–40 |
| Neoabietic | 10–20 |
| Dihydroabietic | 14 |
| Tetrahydroabietic | 14 |
| Dehydroabietic | 5 |
| Dextropimaric | 16 |
| Levopimaric | 1 |
| Non-acids | 8–10 |

In the above, palmitic acid and tetrahydroabietic acid are saturated acids and their radicals in polyethenoxy compounds do not react with ozone. However it is believed that to an extent, some of these saturated acids are dehydrogenated by nascent oxygen and become polyethenoxy esters of unsaturated acids.

For convenience herein, the unsaturated and the saturated acids as a group are represented by the formula RCOOH, the R representing both fatty and "rosin" radicals. The condensation products referred to as polyethenoxy esters, being fatty acid esters, or tallates, or rosinates, or abietates, result from several reactions during the condensation, including ester-forming reactions between the RCOOH and ethylene oxide and between the resulting ester-alcohols and ethylene oxide. In consequence, the reaction mass is a complex mixture commonly identified by its average molecular weight and by the average number of ethenoxy units involved in a formula representing a single compound according to said average molecular weight. Such a general formula is:

$$RCOO-(CH_2-CH_2-O)_nH$$

wherein R is the same as in RCOOH above, and $n$ represents a numerical value, not necessarily a whole number.

Tallate compositions in which $n$ varies from 12 to 18 are well known detergents, which function with little foam and also in hard waters and in alkaline media. The higher the value of $n$ the more compatible is the material with water.

The condensation of a fatty acid, or of tall oil, or of rosin, or of abietic acid, may be carried out in the presence of an alkaline catalyst as well known in the art at elevated temperatures, and as described, for example, in Harris and Kosmin U.S. No. 2,594,431, and also in their U.S. Patent No. 2,594,453. In the condensation there is an apparently unobserved side reaction in which ethylene oxide reverts to ethylene and oxygen as follows:

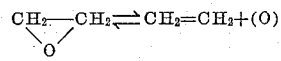

The above reaction is a well-known equilibrium reaction by which ethylene oxide is manufactured when it runs to the left. At the elevated temperatures at which condensations involving it are carried out, there is opportunity for this reversion to occur. The released oxygen is active to effect oxidation of the acid radicals R. In the case of the rosin acids having 6-carbon rings, it is believed that the oxygen dehydrogenates one or more of the structures $-CH_2-CH_2-$ in the rings to form at least one quinoid ring

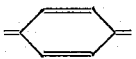

or a semi-quinoid ring

which cause color and fluoresence. Presence of the quinoid structures is evident by the fluorescence of the reaction mass. The fluorescence and the darkening increase and decrease together, and by the color corrective reaction of the present invention both may be lessened.

When the fluorescent dark-colored subject ester-alcohol masses are treated with aqueous hydrogen peroxide, the latter attacks and decolorizes the colored ingredients with loss of fluorescence. Progress of the decolorization may be followed by measuring the change in light-transmittancy of the mass. By subjecting a known amount of the subject ester-alcohol masses having the dark color to gradual additions of known amounts of aqueous hydrogen peroxide and by following the color change, the end point for their destruction may be determined. The darker the original color, the more hydrogen peroxide is needed to remove color and destroy the attendant fluorescence. The result approaches a limit, indicating a maximum capacity for reaction with hydrogen peroxide.

When ozone is used after such limit is reached, the lightening of color continues; and so much more ozone is consumed that it is evident reactions take place which do not occur with hydrogen peroxide. The same result occurs when ozone is used initially instead of hydrogen peroxide. Where fluorescence does not occur in the case of oleic acid esters, for example, and in the absence of rosin acid esters, there is likewise a heavy consumption of ozone, indicating ozonide formation at a double bond.

In the case of straight-chain fatty acids, the color is not characterized by fluorescence, as in the case of rosin acids. The action is likewise believed to be a dehydrogenation of the molecule, being more easily effected in unsaturated chains than in saturated chains. The coloring action seems akin to the darkening of oleic acid on standing exposed to the atmosphere, which coloring is not characteristic of saturated fatty acids, such as palmitic and stearic acids.

The loss of fluorescence clearly indicates the possibility that quinoid structures have been destroyed. The situation is unusual in that the quinoid structures are seemingly formed by one type of oxidation and are then seemingly destroyed by an oxidizing agent, either hydrogen peroxide or ozone. The observations and results described hereinabove conform to a sequence of well-known types of chemical reactions, which as applied to the present invention appear to be a plausable explanation. The following discussion is believed to explain the reactions, but it is not to be assumed that this is the only explanation, and no intention is herein expressed to be bound by it.

In the following suggested reactions, the composition of the general formula given above wherein R includes "rosin" radicals, is here abbreviated to the form RCOOX, which in the case of abietic acid is expanded to the compound I. The oxygen from the reversion of ethylene oxide dehydrogenates the compound I forming double bonds and at least one fluorescent quinoid or semi-quinoid structure. There are several ways in which this may take place and one or more new compounds may be formed. Compounds II, III and IV are merely illustrative. The letter "Q" in a ring indicates that it is a quinoid structure.

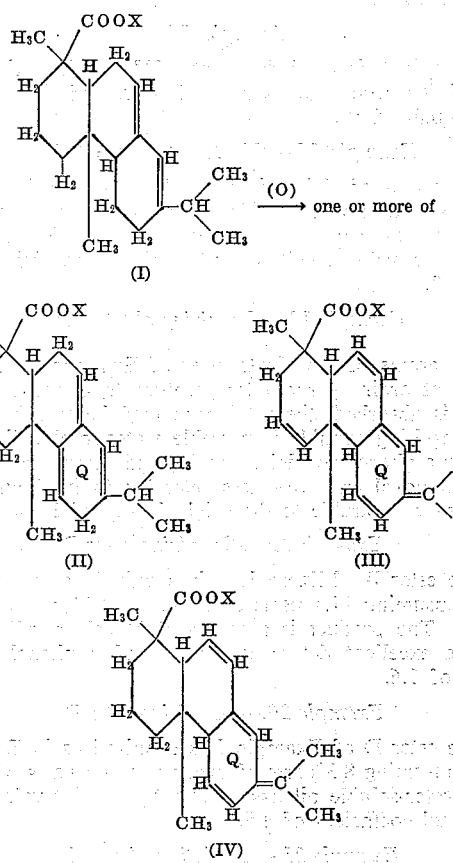

The effect of hydrogen peroxide is believed to be the addition of $H_2O_2$ in the form of two —OH groups at one or more double bonds, and in such locations as to destroy the fluorescent characteristics of the quinoid structures which per se fluoresce and which also join with other non-quinoid double bonds to effect fluorescence. The action is represented thus:

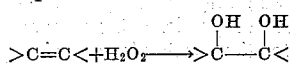

This is a glycol-forming reaction producing a glycol compound which is more compatible with water than its predecessor.

The effect of ozone is believed to be the formation of ozonides at places corresponding to the above-mentioned glycol, thus:

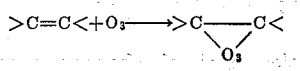

Table I shows the comparative nature of colored condensation products involving "rosin" acids which have been improved by the present invention. These have been made by the general procedure given hereinafter in the examples. Briefly, numerous commercial grades of tall oil have been used, identified by letters from A through H and P through R. Letter L represents pure abietic acid used as are the various tall oils. In Table I:

Column 1 gives the identification letter.
Columns 2 and 3 show, respectively, the weight ratio of rosin acid to fatty acid in the tall oil.
Column 4 represents the average molecular weight of the tall oil or acid used.
Column 5 represents the average molecular weight of the condensation product.
Column 6 represents the transmission of red light by 20 grams of the freshly made product in a Coleman colorimeter tube, the value 100 applying to water.
Columns 7 and 8 represent the comparative detergency of the product by soil removal, respectively in hard water and soft water.

TABLE I

| 1 | 2 | 3 | 4 | 5 | 6 | 7 | 8 |
|---|---|---|---|---|---|---|---|
| A | 30 | 70 | 288 | 864 | 48 | 116 | 123 |
| B | 30 | 70 | 288 | 864 | 39 | 121 | 117 |
| C | 55 | 45 | 293 | 879 | 24 | 124 | 129 |
| D | 6 | 94 | 289 | 867 | 30 | 99 | 112 |
| E | 90 | 10 | 300 | 1,200 | 8 | 137 | 130 |
| F | 90 | 10 | 300 | 900 | 4 | 135 | 119 |
| G | 45 | 55 | 291 | 873 | 35 | 108 | 133 |
| H | 45 | 55 | 291 | 873 | 24 | 120 | 144 |
| L | 100 | 0 | 302 | 904 | 4 | 132 | 127 |
| P | 30 | 70 | 228 | 448 | 54 | | |
| Q | 30 | 70 | 228 | 1,108 | 63 | | |
| R | 30 | 70 | 228 | 1,678 | 78 | | |

The freshly made (except L) products as identified in Table I in 20-gram specimens were placed in a colorimeter tube in a Coleman instrument and the transmission of light by a red filter recorded as column 6. Small known quantities of aqueous 30% hydrogen peroxide were added and after mixing for five minutes readings were taken. The increased light transmission is indicated in Fig. 1. The horizontal base 10 indicates the amount of hydrogen peroxide used, and the vertical ordinate 11 indicates the light transmission. The curves are identified by the same letters as the identifications in Table I. The curve for L was made on the product about four months after its production. The increased transmission is pronounced in each case. However, in each case the correction approaches a limit, indicating the presence of residual color not removed by hydrogen peroxide.

Figure 2:
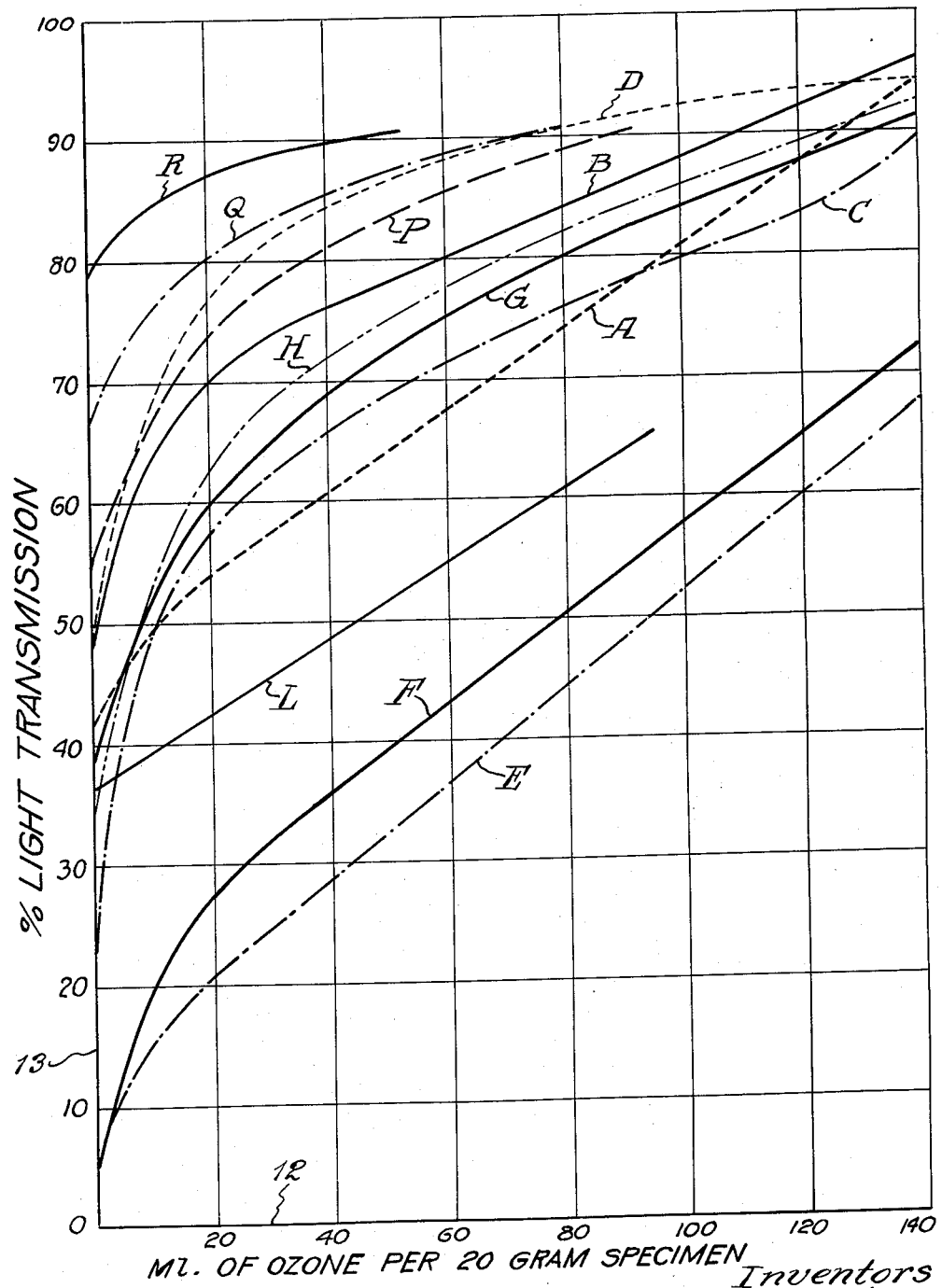
Fig. 2 shows similar curves using ozone in place of hydrogen peroxide, illustrating the greater capacity for reaction with ozone.

In Fig. 2, the same products of Table I in the colorimeter tube are subjected to a stream of ozone bubbled into the 20-gram specimen of the liquid from a calibrated ozone generator. Ozone consumed is recorded as milliliters (ml.), one ml. corresponding to 0.00214 gram of ozone. The horizontal base 12 indicates the ml. of ozone and the ordinate 13 indicates light transmission. The curves do not level off where the curves of Fig. 1 do, thus indicating continued consumption of ozone.

Figure 3:
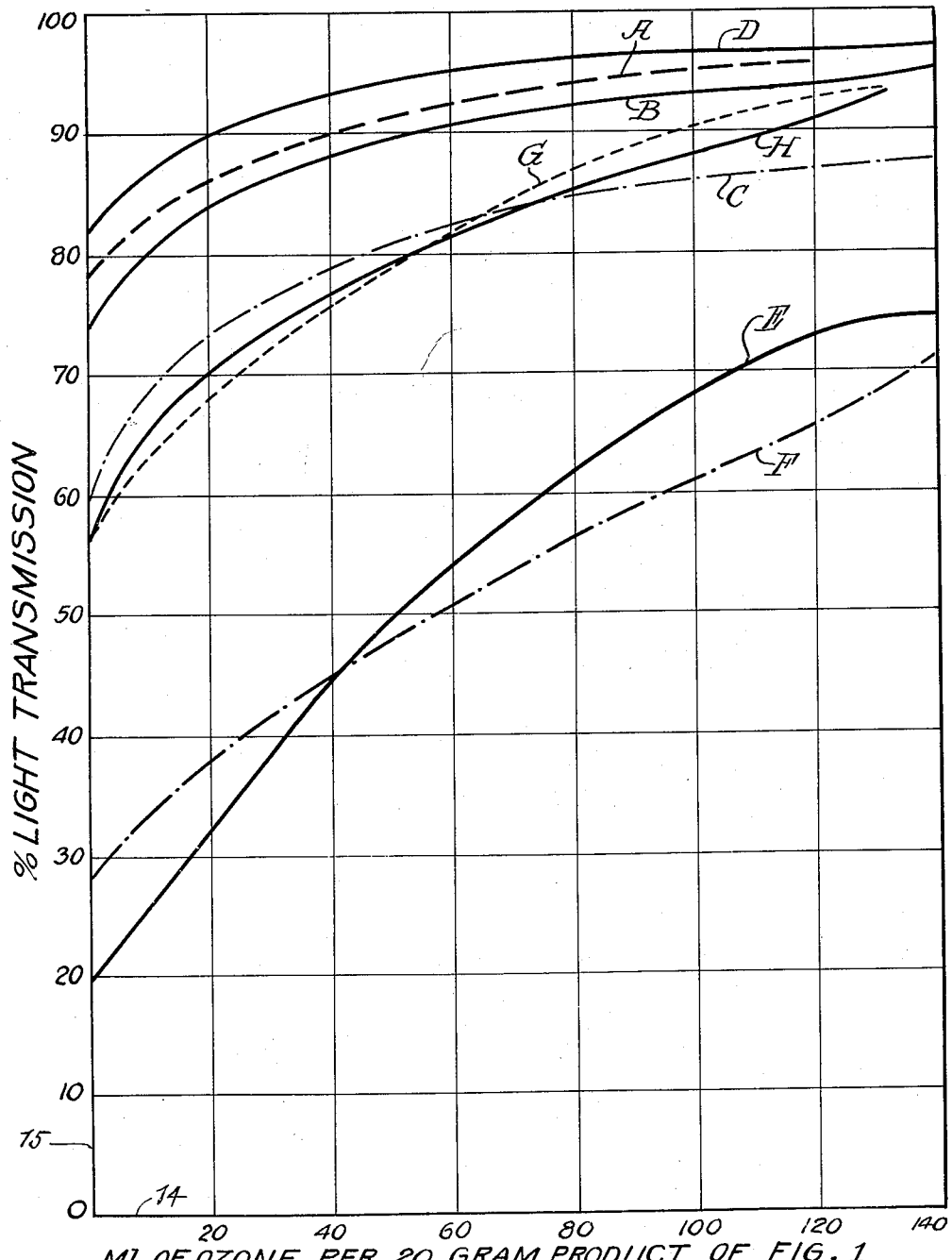
Fig. 3 shows the use of ozone on the products treated to their capacity with hydrogen peroxide as in Fig. 1.

The products decolorized by hydrogen peroxide as charted in Fig. 1, are then further subjected to the action of ozone, giving additional reduction in color, and consuming substantial quantities of ozone, as plotted in Fig. 3. The base 14 represents ozone consumed by the products decolorized with hydrogen peroxide, and the ordinate 15 indicates the additional lightening of color.

It is pointed out that the use of ozone as given in Figs. 2 and 3 is carried out primarily for improvement in color, and not for chemical conversion to the maximum content of possible ozonides. Because ozonides readily form, some are formed at the double bonds of the fatty acid radical as well as at the double bonds of the rosin acids and their quinoid derivatives. It is the discovery of this collateral action which does not occur with hydrogen peroxide, which has led to extending the reaction well beyond the limits for substantial decolorization, to secure the benefits of the products which derive from the ozonide derivatives.

In preparing polyethoxy esters for practice of the present invention the various methods known to the art may be employed. These vary the catalyst, temperature and other factors. The ones identified hereinabove have been prepared by passing ethylene oxide into the acid material at a temperature in the range from 150° to 210° C. in the presence of an alkaline catalyst. The following examples illustrate the preparation of the nine esters above identified.

*Example 1.—Ester P ($n=5$)*

Into a half-liter closed and heated flask containing 100 grams of the selected tall oil P (see Table I), 0.5 gram of potassium carbonate, and an inert atmosphere of nitrogen, initially at 190° C. was bubbled ethylene oxide gas, the excess being vented from the flask. The heat of reaction increased the temperature to about 210° C. During the reaction the temperature was maintained in a range from 170° to 210° C. In about four hours 77 grams of ethylene oxide was taken up by the contents of the flask. A dark colored liquid resulted.

*Example 2.—Ester B ($n=13.1$)*

The tall oil identified under B in Table I was used, under the conditions of Example 1 to absorb 200 grams of ethylene oxide. A dark liquid product resulted.

*Example 3.—Ester Q ($n=20$)*

The tall oil identified under Q in Table I was used under the conditions of Example 1 to absorb 350 grams of ethylene oxide. A dark low-melting solid (at room temperature) was obtained.

*Example 4.—Ester R ($n=32.9$)*

The tall oil identified under R in Table I under the conditions of Example 1 was used to absorb 503 grams of ethylene oxide. A tan solid melting below 60° C. was obtained.

*Example 5.—Ester A ($n=13.1$)*

The tall oil identified under A in Table I under the conditions of Example 1, but with a change of catalyst to 0.5 gram of sodium hydroxide, was used to absorb 200 grams of ethylene oxide.

*Example 6.—Ester C ($n=13.5$)*

The tall oil identified under C in Table I under the conditions of Example 1, was used to absorb 200 grams of ethylene oxide. A dark liquid resulted.

*Example 7.—Ester D ($n=13.1$)*

The tall oil identified under D in Table I, under the conditions of Example 1, was used to absorb 200 grams of ethylene oxide. A dark liquid resulted.

*Example 8.—Ester E ($n=20.4$)*

Under conditions of greater capacity, but similar to those in Example 1, 500 grams of tall oil identified under E in Table I, was used with a change of catalyst to 2.5 grams of sodium hydroxide, to absorb 1500 grams of ethylene oxide. A dark extremely fluorescent liquid was obtained.

*Example 9.—Ester F ($n=13.6$)*

The tall oil identified as F in Table I (and the same as used in Example 8), under the conditions of Example 1, was used to absorb 200 grams of ethylene oxide. A very dark and highly fluorescent liquid was obtained.

*Example 10.—Ester G ($n=13.2$)*

Tall oil identified under G in Table I, under the conditions of Example 1, was used to absorb 200 grams of ethylene oxide. A dark colored liquid was formed.

*Example 11.—Ester H ($n=13.2$)*

Tall oil identified under H in Table I, under the conditions of Example 1, was used to absorb 200 grams of ethylene oxide. A dark liquid resulted.

*Example 12.—Ester L ($n=13.7$)*

Pure crystalline abietic acid under the conditions of Example I was used to absorb 200 grams of ethylene oxide, forming a very dark and highly fluorescent liquid.

*Examples 13, 14 and 15*

In Example 1 the catalyst was changed in kind but not quantity, respectively, to metallic sodium, sodium acetate, and potassium hydroxide. In each case dark fluorescent liquids were obtained, which are lightened by hydrogen peroxide followed by ozone or by ozone alone in the same way as described.

*Example 16*

Example 1 is carried out at 150° C. The time required for absorption is much longer, and the product was equally dark.

*Example 17.—Oleate ester ($n=12.8$)*

100 grams of oleic acid is condensed at 170° C. with 200 grams of ethylene oxide using 0.5 gram of potassium carbonate as catalyst. The resulting polyethenoxy oleate has a value $n=12.8$, and a phenol coefficient less than 0.3.

*Example 18.—Ozonizing oleate ester*

100 grams of the oleate ester of Example 17 is subjected at ordinary room temperature to ozone until no more is absorbed, the total consumed being 5.9 grams. The resulting ozonide is a stable water-soluble light oil having a phenol coefficient of 11, and detergency values (soil removal and whiteness retention in hard and soft waters) comparable to the original ester of Example 17.

*Example 19.—Ozonizing ester B*

The ester B of Example 2 is ozonized as in Example 18, consuming 11.1 parts of ozone per 100 parts of the ester. The product is a water-soluble clear yellow oil, having excellent detergent values, and a phenol coefficient of 1.6.

*Example 20.—Ozonizing ester D*

The ester D of Example 7 is ozonized as in Example 18, consuming 8.3 parts of ozone per 100 parts of ester. The water-soluble oil has excellent detergent values and a phenol coefficient of 4.5.

*Example 21.—Oxidation of ozonide*

The polyethenoxy oleate ozonide of Example 18 in the amount of 25 ml. was acidified with 25 ml. of glacial acetic acid, to which was added 10 grams of aqueous 30% hydrogen peroxide. The mass was refluxed for 1.5 hours, then 2 grams of said peroxide solution was added and again refluxed for 1.5 hours. The product is a light yellow acidic oil weighing 17 grams, soluble in water, having fair detergent properties and a phenol coefficient of 3.

According to the probable chemistry involved the ozonide

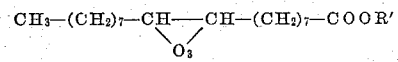

where R' represents the polyethenoxy portion of the ester, splits in the reaction

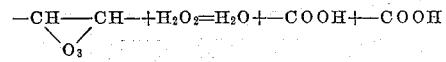

giving one molecule of polyethenoxy monoazelate of the formula $HOOC-(CH_2)_7-COOR'$ and one molecule of pelargonic acid of the formula $CH_3-(CH_2)_7-COOH$.

In the oxidation as described above, and in reductions hereinafter described, an ozonide at the initial location of a double bond is broken and the molecule splits at said location.

In the case of the polyethenoxy oleate split by reduction, the products are polyethenoxy-w-aldehydo-caprylate of the formula

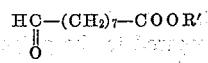

and pelargonic aldehyde of the formula

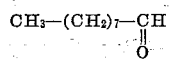

In the case of polyethenoxy linoleate, which is a constituent of polyethenoxy tallate, there are two double bonds and hence two ozonide groups so that the molecule breaks into three parts. When oxidized the ozonide breaks into polyethenoxy monoazelate (as above in Example 21); into hexanoic acid of the formula

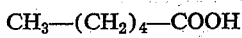

and malonic acid of the formula HOOC—CH$_2$—COOH. When reduced, the products are polyethenoxy-w-aldehydo-caprylate (as above in Example 21); hexaldehyde and malonaldehyde.

In the cases of the polyethenoxy rosinates, which are constituents of the polyethenoxy tallates, ozonides are formed at double bonds in the rings. On oxidation and reduction, the rings break at the location of the original double bond. To illustrate, abietic acid is represented as the complete ozonide of its polyethenoxy ester, thus:

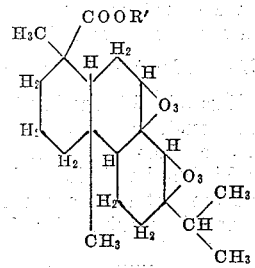

On oxidation, the same changes occur, i.e., a carbon-to-carbon bond of the acid radical is split and when it is a bond in a ring the molecule remains without being split into two molecules, thus:

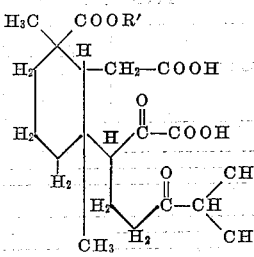

which is 2,6,dimethyl - 2 - polyethenoxy-carboxylate,6(1'-oxalyl - 4' - keto-5'-methyl)hexyl - cyclohexyl-acetic acid. On reduction the compound formed has the aldehyde groups —CHO where the —COOH groups are located, and the product is: 2,6,dimethyl-2-polyethenoxy-carboxylate - 6(1' - glyoxyl - 4' - keto - 3' - methyl)hexylcyclohexylacetaldehyde.

Of other rosin acids of which the polyethenoxy esters exist in polyethenoxy tallate, the products of oxidation and of reduction of the complete ozonides are merely named without graphical representation.

Neoabietic acid leads to an ozonide which oxidizes to: 5,10,dimethyl - 5 - polyethenoxy - carboxylate - 2 - decalone-1-a-keto-butyric acid; and which reduces to: 5,10, dimethyl - 5 - polyethenoxy - carboxylate - 1 - (3' - keto)-butyral-decalone-2.

Dihydroabietic acid leads to an ozonide which oxidizes and reduces to the same compound 2,3(1,5,dimethyl-5-polyethenoxy - carboxylate)cyclohexo - 8 - isopropyl - cyclodecanedione-1,6.

Tetrahydroabietic acid. There are no double bonds in this molecule, and hence no ozonides are formed from the polyethenoxy ester thereof.

Dehydroabietic acid has three double bonds, and hence leads to incomplete and complete ozonides. On oxidation of the complete ozonide, there is formed 2,6,dimethyl-2 - carboxy - 6 - polyethenoxy - carboxylate - cyclohexylpropionic acid. On reduction there is formed 2,6,dimethyl - 2 - aldehydo - 6 - polyethenoxy - carboxylate-cyclohexyl-propional.

Dextropimaric acid leads to an ozonide which on oxidation yields 5,10,dimethyl-5-polyethenoxy-carboxylate-2-decalone-1-(2'-methyl-2'-ethyl) butyric acid; and which on reduction yields 5,10,dimethyl-5-polyethenoxy-carboxylate-2-decalone-1-(2'-methyl-2'-ethyl)butyral.

Levopimaric acid having two double bonds leads to incomplete and complete ozonides, of which the latter on oxidation yields 5,10,dimethyl-5-polyethenoxy-carboxylate-2-decalone-1-acetic acid. On reduction the complete ozonide yields the aldehyde of the last-given acid.

The following examples additionally illustrate forming complete ozonides of polyethenoxy esters of unsaturated fatty and rosin acids.

*Example 22*

Ozone was passed into 106 grams of tallate ester C and 10 grams of ozone were thereby consumed, forming ozonides of fatty and rosin acids. The product is a stable water-soluble oil having excellent detergent properties and a phenol coefficient of 1.2 in terms of *Straphylococcus aureus*. At a pH in the range from 3 to 4 the phenol coefficient is increased to the vicinity of 80, but the detergent values are greatly reduced.

*Example 23*

Tallate ester F is subjected to ozone until completely ozonized by 10 parts of ozone per 100 parts of ester. The product is similar to that of Example 22.

*Example 24*

The polyethenoxy abietate L is completely ozonized by 11.8 parts of ozone per 100 of ester, giving a product similar in physical properties to that of Example 23.

The following examples additionally illustrate oxidation of ozonides to break the carbon-to-carbon linkage, as described.

*Example 25*

20 grams of the polyethenoxy tallate ozonide of Example 19 was oxidized with hydrogen peroxide by the procedure of Example 21, giving 17 grams of a light yellow acidic oil, having good detergent properties.

*Example 26*

20 grams of the ozonide prepared in Example 22 from ester C, is oxidized by hydrogen peroxide, using the procedure of Example 21, giving 18.5 grams of water-soluble light yellow oil.

*Example 27*

20 grams of ozonide prepared in Example 23 from ester F, is oxidized by hydrogen peroxide using the procedure of Example 21, giving 18 grams of a brown water-soluble oil.

20 grams of the complete ozonide prepared by Ex-

*Example 28*

20 grams of the complete ozonide prepared by Example 24 from the polyethenoxy abietate L, is oxidized by hydrogen peroxide using the procedure of Example 21, yielding 20 grams of a light yellow oil, which is identified above.

The following examples illustrate reduction of complete ozonides of polyethenoxy esters of unsaturated fatty and rosin acids, the examples beginning with an ester of oleic acid as an example of unsaturated fatty acid, continuing with esters of tall oils as examples of various mixtures of fatty acids and rosin acids, and finishing with an ester of abietic acid as an example of unsaturated fatty acid.

*Example 29*

41 grams of ozonide prepared in Example 18 from polyethenoxy oleate of Example 17 is dissolved in 100 ml. of water to which is added 50 grams of zinc dust. The mass was refluxed for one hour at atmospheric pressure. The liquid was separated from the zinc residues, which were washed with water. The washings were added to the liquid. The liquid was dewatered by boiling, yielding 30 grams of a light yellow residual oil. The oil has good detergent properties. The oil is identified above, as the aldehydes of the acids obtained in Example 21, namely, polyethenoxy-w-aldehydo-caprylate, and pelargonic aldehyde.

*Example 30*

51 grams of the ozonide prepared in Example 19 from the ester B, is reduced by zinc and the product recovered as in Example 29, yielding 43 grams of a mixture having properties similar to the product of Example 29.

*Example 31*

30 grams of ozonide prepared in Example 22 from the ester C, is reduced with zinc, using the procedure of Example 29. A yield of 29 grams of mixed aldehydes and ketones is obtained having excellent detergent properties.

*Example 32*

31 grams of ozonide prepared in Example 23 from ester F are reduced with zinc, using the procedure of Example 29, yielding a water-soluble mixture of aldehydes and ketones having excellent detergent properties.

*Example 33*

38 grams of the complete ozonide prepared in Example 24 from the polyethenoxy abietate L, are reduced by zinc according to the procedure of Example 29, yielding 35 grams of a brown water-soluble oil of the composition named above, following the graphical formula of the ozonide employed.

Because ozone is relatively more expensive than hydrogen peroxide, the preferred products of the present invention are those which are compatible with aqueous hydrogen peroxide, and the term "water-dispersible" is used herein to comprehend "water-soluble." Although the preferred compounds are those useful in or as detergents, the utility of the products is not set forth as a limitation of the invention.

The invention comprehends polyethenoxy esters of unsaturated aliphatic acids derived from use initially of the corresponding saturated acids. In the condensation the unsaturation is effected, giving colored condensation products subject to decolorization by the present invention. It is believed that the unsaturation is the result of dehydrogenation related to the equilibrium reaction between ethylene and oxygen on one side and ethylene oxide on the other.

The invention comprehends the formation and decolorization of the subject condensation reaction masses which are on the one hand water-dispersible or water-soluble, or on the other hand substantially immiscible with water. In the former instance, the decolorization may be effected first by aqueous hydrogen peroxide solution and then by ozone, while in the case of an immiscible condensation mass, ozone alone is used.

*Example 34.—Polyethenoxy pelargonate (S)*

According to the procedure above described 158 grams of pelargonic acid are condensed at 160° to 175° C. in the presence of 0.5 gram of potassium carbonate as catalyst, with 264 grams of ethylene oxide, forming a mass of polyethenoxy ester corresponding to the general formula $$CH_3-(CH_2)_7-COO-(CH_2-CH_2-O)_x-H$$

wherein $x=6$. The mass is a brown oil, substantially non-fluorescent compared to the polyethenoxy abietates, water-dispersible, and a detergent. The following Table II gives the increase in light transmittancy as ozone is added.

*Example 35.—Polyethenoxy laurate (T)*

According to the procedure above described 200 grams of lauric acid are condensed at 160° to 190° C. in the presence of 1 gram of potassium carbonate as catalyst, with 440 grams of ethylene oxide, forming a mass of polyethenoxy ester corresponding to the general formula $$CH_3-(CH_2)_{10}-COO-(CH_2-CH_2-O)_x-H$$

wherein $x=10$. It is a dark brown oil having the same characteristics as ester (S) in Example 34. Table II gives the data on decolorization with ozone.

*Example 36.—Polyethenoxy laurate (U)*

According to Example 35, modified to use only 176 grams of ethylene oxide, an ester mass is formed in which the $x=4$. It is an oil lighter in color than that of Example 35, but immiscible with water. Table II indicates the lighter color, seemingly reflecting less effect from the reversion of ethylene oxide to its forming factors, and a lessened extent of such reversion. Table II also shows less use of ozone to lighten the color.

*Example 37.—Polyethenoxy pelargonate (V)*

According to Example 34, modified to use only 88 grams of ethylene oxide, an ester mass is formed in which $x=2$. The ester mass is an oil lighter in color than that of Example 34, but immiscible with water. Table II shows that the amount of ozone used to decolorize it is much less than is required for the ester mass of Example 34.

Table II shows the milliliters of ozone used to decolorize 20-gram specimens, by the procedure described for securing the data of Fig. 2.

TABLE II

| Ml. of ozone | Percent light transmission | | | |
| --- | --- | --- | --- | --- |
| | S | T | U | V |
| 0 | 32.5 | 32.5 | 74.5 | 68 |
| 10 | | | | |
| 12.2 | | | 82.5 | |
| 15.7 | | | | 89 |
| 20 | 39.5 | 44.5 | | |
| 24.5 | | | | 94 |
| 27.1 | | | 91.0 | |
| 40 | 51.0 | 58.0 | | |
| 60 | 67.0 | 71.0 | | |
| 80 | 80.0 | 81.0 | | |
| 100 | 89.5 | 87.5 | | |

In the case of those products which are useful for detergency, it has been observed that the action of ozone in the present invention, alone, or following the action of hydrogen peroxide, to an extent far short of the limit of absorption and for the purpose of lightening the color, produces products of increased detergency. Also, complete ozonizing of the products produces excellent detergents with excellent bactericidal value. Detergency tests are carried out as described below. A value of 100, assigned to the standard, represents the detergency of an excellent commercial detergent. Consequently even small increases over 100 are significant of considerable improvement.

DETERGENCY TESTS

Evaluating products of the present invention for detergency is carried out in the manner set forth by Vaughn and Suter in J. Am. Oil. Chem. Soc., vol. 27, pp. 249–257 (1950). In the present instance, a composition is made in parts by weight as follows:

| | |
|---|---|
| Specimen of polyethenoxy ester | 20 |
| Tetrasodium pyrophosphate | 20 |
| Sodium tripolyphosphate | 20 |
| Soda ash | 39 |
| Carboxymethyl cellulose | 1 |

A standard is chosen of the following composition:

| | |
|---|---|
| Polyethenoxy tallate (Sterox CD*) | 15 |
| Tetrasodium pyrosphosphate | 20 |
| Sodium tripolyphosphate | 20 |
| Soda ash | 20 |
| Silicate of soda ($Na_2O.SiO_2$) | 24 |
| Carboxymethyl cellulose | 1 |

*Monsanto Chemical Co., St. Louis, Missouri.

The detergencies of the standard composition (taken as 100) and of the test composition are determined by dissolving the composition in the amount of 2.5 grams per liter of water. A standard launderometer is used.

Four values are determined, as follows:

(1) Soil removal in hard water (255 p.p.m.).
(2) Soil removal in soft water.
(3) Whiteness retention in hard water (255 p.p.m.).
(4) Whiteness retention in soft water.

The following table III gives detergency values of the materials prepared by the examples above, or of the products otherwise identified.

TABLE III—DETERGENCY

| Product | Soil Removal | | Whiteness Retention | |
|---|---|---|---|---|
| | Hard Water | Soft Water | Hard Water | Soft Water |
| Polyethenoxy: | | | | |
| Ester B (Ex. 2) | 121 | 117 | 119 | 124 |
| Ester B (Fig. 2) | 131 | 115 | 133 | 132 |
| Ester B (Fig. 3) | 145 | 108 | 125 | 127 |
| Ester D (Ex. 7) | 99 | 112 | 121 | 127 |
| Ester D (Fig. 2) | 106 | 122 | 140 | 132 |
| Ester D (Fig. 3) | 131 | 116 | 131 | 128 |
| Ester F (Ex. 9) | 112 | 119 | 128 | 116 |
| Ester F (Fig. 2) | 123 | 129 | 142 | 136 |
| Ester F (Fig. 3) | 125 | 128 | 141 | 136 |
| Ester C (Ex. 6) | 124 | 129 | 125 | 123 |
| Ester L (Ex. 12) | 132 | 127 | 119 | 125 |
| Ozonides: | | | | |
| Ex. 18 (oleate) | 97 | 109 | 79 | 95 |
| Ex. 19 (B) | 88 | 98 | 78 | 89 |
| Ex. 22 (C) | 107 | 114 | 105 | 109 |
| Ex. 23 (F) | 103 | 111 | 92 | 106 |
| Ex. 24 (L) | 128 | 119 | 95 | 111 |
| Oxidized ozonides: | | | | |
| Ex. 21 (of oleate) | 100 | 108 | 76 | 72 |
| Ex. 25 (of B) | 92 | 95 | 76 | 89 |
| Ex. 26 (of C) | 116 | 116 | 97 | 114 |
| Ex. 27 (of F) | 143 | 102 | 88 | 95 |
| Ex. 28 (of L) | 105 | 106 | 88 | 95 |
| Reduced ozonides: | | | | |
| Ex. 29 (of oleate) | 73 | 85 | 71 | 90 |
| Ex. 30 (of B) | 90 | 103 | 80 | 101 |
| Ex. 31 (of C) | 105 | 117 | 101 | 123 |
| Ex. 32 (of F) | 120 | 126 | 91 | 121 |
| Ex. 33 (of L) | 113 | 125 | 89 | 118 |

From all the foregoing it appears that all the water-soluble polyethenoxy esters of acid selected from the group consisting of unsaturated fatty acid and unsaturated rosin acids, as condensation reaction masses of the corresponding comparable unsaturated and saturated free acid with ethylene oxide, are subject to improvement in color, by the lightening action of ozone, and of hydrogen peroxide followed by ozone. In such action, ozone acts within the acid radical at the same time, forming ozonides. Ozonides form at double bonds, and hence where unsaturated acids are used initially there are more double bonds, than where only the saturated acids are used. Ozonide formation continues long after the decolorizing effect ceases, and it may be carried to a limit of absorption of ozone by the mass. The ozonides have excellent detergency and also bactericidal value. The ozonides are subject to both oxidation and reduction to split the carbon-to-carbon bond at the location of the ozonide, variously forming acids, aldehydes and ketones, also of excellent detergent and bactericidal value. In the case of the straight-chain fatty acids, the molecule is split, forming one polyethenoxy compound, and another free from the ethenoxy group. In the case of the rosin acids, the molecule is not split, but one or more rings are opened, as described.

The present invention contemplates the use of ozone in quantities ranging from small usage to maximum usage for all effects and functions thereby secured. It also contemplates the oxidizing and reduction of the complete ozonides. All the products secured as described, resulting from treatment with at least a decolorizing quantity of ozone are considered to be new products of the present invention.

We claim:

1. The method of treating water-dispersible polyethenoxy ester and the bleached esters which are reaction products thereof with aqueous hydrogen peroxide, which unbleached ester consists of a mass resulting from condensing ethylene oxide with monocarboxylic acid selected from the group consisting of saturated aliphatic acids having from 9 to 18 atom chains, unsaturated aliphatic acids having from 9 to 18 carbon atom chains, abietic acid, rosin acids and tall oil, which comprises increasing the light-transmittancy and detergency by subjecting said ester material in liquid form to the action of ozone.

2. The method of claim 1 wherein the selected acid contains at least one unsaturated carbon-to-carbon bond in the acid radical.

3. The method of claim 1 wherein the selected acid is tall oil.

4. The method of treating water-dispersible polyethenoxy ester and the bleached esters which are reaction products thereof with aqueous hydrogen peroxide, which unbleached ester consists of a mass resulting from condensing ethylene oxide with monocarboxylic acid selected from the group consisting of saturated aliphatic acids having from 9 to 18 carbon atom chains, unsaturated aliphatic acids having from 9 to 18 carbon atom chains, abietic acid, rosin acids, and tall oil, which comprises subjecting said ester material in liquid form to the action of ozone for a time at least until substantially the maximum light-transmittancy is effected.

5. The method of claim 4 wherein the selected acid contains at least one unsaturated carbon-to-carbon bond in the acid radical.

6. The method of claim 4 wherein the selected acid is tall oil.

7. The method of treating water-dispersible polyethenoxy ester and the bleached esters which are reaction products thereof with aqueous hydrogen peroxide, which unbleached ester consists of a mass resulting from condensing ethylene oxide with monocarboxylic acid selected from the group consisting of saturated aliphatic acids having from 9 to 18 carbon atom chains, unsaturated aliphatic acids having from 9 to 18 carbon atom chains, abietic acid, unsaturated rosin acids, an dtall oil, which comprises subjecting said ester material in liquid form to the action of ozone for a time until the maximum light-transmittancy is effected, and continuing the subjection to ozone whereby to form ozonides.

8. The method of claim 7 in which the selected acid contains at least one unsaturated carbon-to-carbon bond in the acid radical.

9. The method of claim 7 in which the selected acid is tall oil.

10. The products of reaction of claim 1.

11. The products of reaction of claim 3.

12. The products of reaction of claim 4.

13. The products of reaction of claim 6.
14. The products of reaction of claim 7.
15. The products of reaction of claim 9.

References Cited in the file of this patent

UNITED STATES PATENTS

| | | |
|---|---|---|
| 698,741 | Schaal et al. | Apr. 29, 1902 |
| 770,275 | Endemann | Sept. 20, 1904 |
| 1,910,799 | Kennedy | May 23, 1933 |
| 2,297,083 | Svensson | Sept. 29, 1942 |
| 2,435,831 | Harvey | Feb. 10, 1948 |
| 2,454,808 | Kirkpatrick et al. | Nov. 30, 1948 |
| 2,529,831 | Brandner | Nov. 14, 1950 |

OTHER REFERENCES

Wagner and Zook: Synthetic Org. Chem. (1953), John Wiley and Sons, p. 421.

Ruzicka et al.: Helvetica Chimeca Acta, vol. 21, pp. 565–582 (1938).